US008543903B2

(12) United States Patent
Malkin et al.

(10) Patent No.: US 8,543,903 B2
(45) Date of Patent: Sep. 24, 2013

(54) SYSTEM AND METHOD OF INTEGRATING A PLURALITY OF FORM RELATED WORKFLOW TOOLS

(75) Inventors: Wayne Allan Malkin, Edmonton (CA); Charles David Perman, Sooke (CA); Brent Alexander Taylor, Spruce Grove (CA)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 12/013,750

(22) Filed: Jan. 14, 2008

(65) Prior Publication Data

US 2009/0183063 A1    Jul. 16, 2009

(51) Int. Cl.
*G06F 17/00*    (2006.01)

(52) U.S. Cl.
USPC .......................................... 715/221; 715/222

(58) Field of Classification Search
USPC .......................... 715/221–226, 234–237, 760
See application file for complete search history.

(56) References Cited

U.S. PATENT DOCUMENTS

| | | | |
|---|---|---|---|
| 6,314,415 B1 * | 11/2001 | Mukherjee | 706/47 |
| 7,546,576 B2 * | 6/2009 | Egli | 717/106 |
| 7,644,351 B1 * | 1/2010 | Portnoy et al. | 715/226 |
| 2003/0110443 A1 * | 6/2003 | Yankovich et al. | 715/501.1 |
| 2006/0036634 A1 | 2/2006 | Kristiansen et al. | |
| 2006/0150107 A1 | 7/2006 | Leung et al. | |

OTHER PUBLICATIONS

Bernstein, "How Can Cooperative Work Tools Support Dynamic Group Processes? Bridging the Specificity Frontier" CSCW '00, Dec. 2-6, 2000, copyright 2000 ACM, p. 279-288.*

* cited by examiner

*Primary Examiner* — Amelia Rutledge
(74) *Attorney, Agent, or Firm* — Toler Law Group (57) ABSTRACT

A method is provided that includes receiving a request at a server from a client device to configure a form associated with a workflow step. The form is of a form type that supports a set of features. The method also includes identifying a form tool of a plurality of form tools that is compatible with the form type. In addition, the method includes generating form feature discovery instructions via a form integration framework application programming interface (API). The form integration framework API utilizes a common set of instructions adapted to direct the plurality of form tools. Further, the method includes providing a set of user interfaces via the form integration framework to the client device based at least in part on form feature data provided via the form tool. The set of user interfaces is adapted to configure the form to generate a configured form.

20 Claims, 4 Drawing Sheets

SYSTEM AND METHOD OF INTEGRATING A PLURALITY OF FORM RELATED WORKFLOW TOOLS

I. FIELD

The present disclosure is generally related to systems and methods of integrating a plurality of form related workflow tools.

II. BACKGROUND

Business process management (BPM) systems can include a number of functions or applications related to a workflow process. BPM systems manage processes within a company. Further, BPM systems may utilize a workflow map that includes a number of workflow steps associated with a particular workflow process and a workflow policy that is developed to provide resources, such as a form, to a workflow participant involved in one or more workflow steps. Companies tend to appreciate flexibility in the design and application of their workflow processes and simplicity in the implementation of workflow processes. For example, a company may want to include forms with a number of different types in various steps of the workflow process. Typically, each form type is associated with a corresponding application programming interface (API) that allows the form to be integrated into the workflow process. The integration of a plurality of APIs into the workflow process can be costly and burdensome to implement. Hence, there is a need for an improved system and method of integrating a plurality of form related workflow tools.

III. SUMMARY

A system is disclosed that includes a form integration framework that is adapted to receive a request from a workflow engine to render a form. The form is associated with a respective form type of a plurality of form types and each form type is associated with a respective set of features. The form integration framework is also adapted to determine a form tool to render the form based on the respective form type associated with the form, where the form tool is one of a plurality of form tools. In addition, the form integration framework is adapted to identify one or more features associated with the form, where the one or more features is included in the set of features associated with the respective form type associated with the form. Further, the form integration framework is adapted to generate form rendering instructions via an application programming interface (API) and send the form rendering instructions to the form tool. The form rendering instructions are related to the one or more features associated with the form and the API includes a common set of instructions utilized to direct each of the plurality of form tools. The form tool is associated with the respective form type and the form tool is adapted to render the form based on the form rendering instructions received from the form integration framework and provide a form user interface to the client device, where the form user interface includes the rendered form.

In another embodiment, a method is disclosed that includes receiving a first request at a server from a client device to configure a first form associated with a first workflow step of a plurality of workflow steps. The first form is of a first form type that supports a first set of features. The method also includes identifying a first form tool that is compatible with the first form type, where the first form tool is one of a plurality of form tools. In addition, the method includes generating first form feature discovery instructions via a form integration framework application programming interface (API). The form integration framework API utilizes a common set of instructions adapted to direct each of the plurality of form tools and the first form feature discovery instructions are related to identifying the first set of features associated with the first form. Further, the method includes providing first form feature data to the form integration framework via a first form tool based on the first form feature discovery instructions and providing a first set of user interfaces to the client device via the form integration framework based at least in part on the first form feature data. The first set of user interfaces is adapted to configure the first form to include at least one of the first set of features to generate a first configured form.

In another embodiment, a computer program product is disclosed that includes a computer useable medium including a computer readable program. The computer readable program when executed on a computer causes the computer to receive a workflow operation request, where the workflow operation request is associated with a particular workflow step, and identify a workflow tool operative to execute the workflow operation request. The identified workflow tool is one of a plurality of workflow tools. The computer readable program when executed on a computer also causes the computer to generate one or more instructions to respond to the workflow operation request via an application programming interface (API) and send the one or more instructions to the identified workflow tool. The API includes a common set of instructions adapted to direct each of the plurality of workflow tools.

V. DETAILED DESCRIPTION

Figure 1:
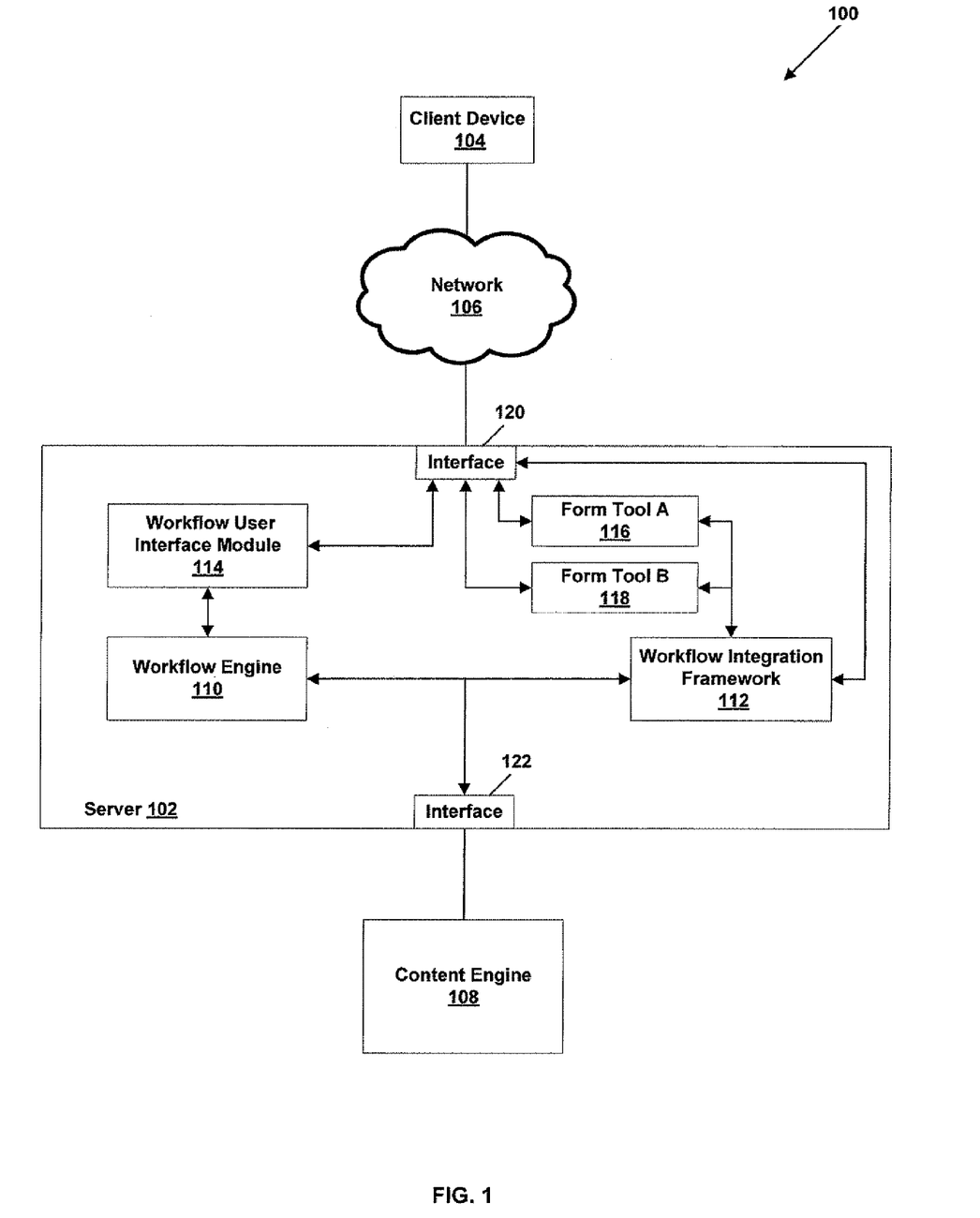
FIG. 1 is a diagram of a particular embodiment of a system to integrate a plurality of form related workflow tools.

Referring to FIG. 1, a computing system and network is illustrated. The computing system 100 includes a server 102 coupled to a distributed computer network 106. The distributed computer network 106 may be a public or private Internet and may be coupled to one or more client devices, such as the illustrated client device 104. A particular embodiment of a client device 104 may be an end user terminal, a personal computer (PC), a personal digital assistant, a laptop computer, or other device with computing capability.

The server 102 includes a network interface 120 coupled to the computer network 106. The network interface 120 may include one or more hardware interfaces, one or more software interfaces, or any combination thereof. In an illustrative, non-limiting embodiment, the network interface 120 may include a web server adapted to communicate with the client device 104 via the network 106. The server 102 also includes a workflow user interface module 114 coupled to a workflow engine 110 and coupled to the interface 120. Additionally, the workflow engine 110 is coupled to the workflow integration framework 112 and the second interface 122. The second interface 122 is coupled to a content engine 108. The second interface 122 may be coupled to the content engine 108 via a local area network, a wide area network, a wireless network, a wireline network, or any combination thereof. In a particular embodiment, the content engine 108 may be implemented as a database, such as a remote or local database. In an illustrative, non-limiting embodiment, the workflow engine 110 and the workflow interface user module 114 may be included in a business process management (BPM) platform associated with a particular company to manage processes of that company.

The workflow integration framework 112 is coupled to the interfaces 120, 122 and is also coupled to and supports a plurality of different workflow tools, such as a first illustrative form tool A 116, and a second illustrative form tool B 118. Each of the form tools 116 and 118 are coupled to the network interface 120 to provide a form specific user interface to an end client device, such as the illustrated client device 104 via the computer network 106. The form tools 116, 118 may also be coupled to the interface 122. The workflow integration framework 112 cooperates with the workflow engine 110 and the workflow user interface module 114 to provide a common framework to support multiple form tools of different form types, such as the illustrated form tools 116 and 118. Further, the server 102 may include one or more additional workflow tools that are not associated with operations related to forms. For example, the workflow integration framework 112 may be coupled to a workflow tool that is configured provide one or more user interfaces that include documents that have been rendered using optical character recognition (OCR).

In a particular embodiment, the workflow integration framework 112 includes an application programming interface (API) that includes a plurality of common instructions that may be utilized in connection with a workflow process to integrate with a variety of different form specific tools. In an illustrative embodiment, the workflow integration framework 112 may receive a first request from the workflow engine 110 related to performing a first operation with respect to a first form having a first form type, such as a Lotus® form. The workflow integration framework 112 identifies a first form tool that supports the first form type, such as the form tool A 116, and directs the first form tool to provide a response to the requested operation using the instructions provided by the API. Further, the workflow integration framework 112 may receive a second request from the workflow engine 110 related to performing a second operation with respect to a second form having a second form type, such as a FileNet® form. The workflow integration framework 112 identifies a second form tool that supports the second form type, such as the form tool B 118, and directs the second form tool to provide a response to the requested second operation using the common set of instructions associated with the API. In this way, a common API can be utilized to integrate a plurality of form tools that each support a respective form type with the workflow processes managed by the workflow engine 110. Additional form tools that support additional form types can also be integrated with the workflow processes managed by the workflow engine 110, as desired.

During operation, the workflow engine 110 may add a workflow item to a queue associated with a particular workflow participant. The workflow item may be associated with a step in a workflow process, such as verifying that a purchase order form has been filled out correctly. The workflow process may include a plurality of workflow steps that are included in a workflow map related to the workflow process. After the workflow item has been placed in the queue of the workflow participant, the server 102 may receive a request from the client device 104 via the network 106 related to viewing the workflow items in the queue. The workflow user interface module 114 is adapted to provide at least one user interface to the client device that includes the list of workflow items in the queue of the workflow participant. Additionally, the server 102 may receive a workflow operation request from the client device 104 related to the workflow item. For example, the workflow operation request may relate to viewing a form, such as the purchase order form, associated with the workflow item.

After receiving the workflow operation request related to viewing the form, the workflow engine 110 may retrieve data related to the form, such as a form template, from an object store, such as an object store within the content engine 108. The workflow engine 110 may also retrieve additional form-related data from the content engine 108, workflow data fields within the workflow engine 110, or an external source. The additional form-related data may be associated with features of the form that are enabled at a particular step of the workflow. The workflow integration framework 112 provides instructions to one of the form tools, such as the form tool A 116, to merge the form data and the additional form-related data to render the requested form.

The server 102 performs one or more operations to respond to the workflow operation request to view the form. The form may be associated with a form type of a plurality of available form types. The particular operations enabled for execution may be dependent on the form type of the form and the data retrieved from the content engine 108 related to the form. In a particular example, based on the form type of the form, the workflow integration framework 112 may direct the form tool A 116 to render the form using the common API of the workflow integration framework 112. The form tool A 116 may render the form and provide to the client device 104 one or more user interfaces including the form. In an illustrative, non-limiting embodiment, the form tool A 116 may communicate with a remote server during the rendering of the form.

Additionally, the workflow engine 110 may send an additional workflow operation request to the workflow integration framework 112 to determine a next step in a workflow process. The workflow integration framework 112 may direct the workflow tool A 116 to extract a value from a field of the form to respond to the additional workflow operation request. The workflow tool A 116 may provide workflow operation output data indicating the value of the field to the workflow engine 110 via the workflow integration framework 112 and the workflow engine 110 may ten initiate a particular workflow step based on the workflow operation output data.

Further, the workflow engine 110 may receive workflow step completion data from the client device 104 via the form tool A 116 indicating that the workflow step associated with the form has been completed. For example, the workflow engine 110 may receive workflow step completion data verifying that a purchase order has been filled out correctly. The workflow engine 110 may then send data to the content engine 108 related to the completed workflow step and implement a subsequent workflow step. To illustrate, the workflow engine 110 may push the correctly filled out purchase order form to a subsequent workflow step that relates to an additional workflow participant, such as a manager, approving the purchase order form. Implementing the subsequent workflow step may include adding a workflow item to a queue of the additional workflow participant that has been designated to approve the purchase order form.

In addition to retrieving data and performing operations customized for a first form type using a first form tool, such as the form tool A 116, the server 102 may receive data and perform customized and selected operations associated with a second form type, using a second form tool, such as the form tool B 118. Further, each of the form types may be associated with a unique format.

In some embodiments, the illustrative server 102 may reside on one or more physical servers or clusters of servers, and the elements 110-122 included in the server 102 may be distributed among a plurality of devices or servers or may be implemented as any number of software components and related interfaces.

Figure 2:
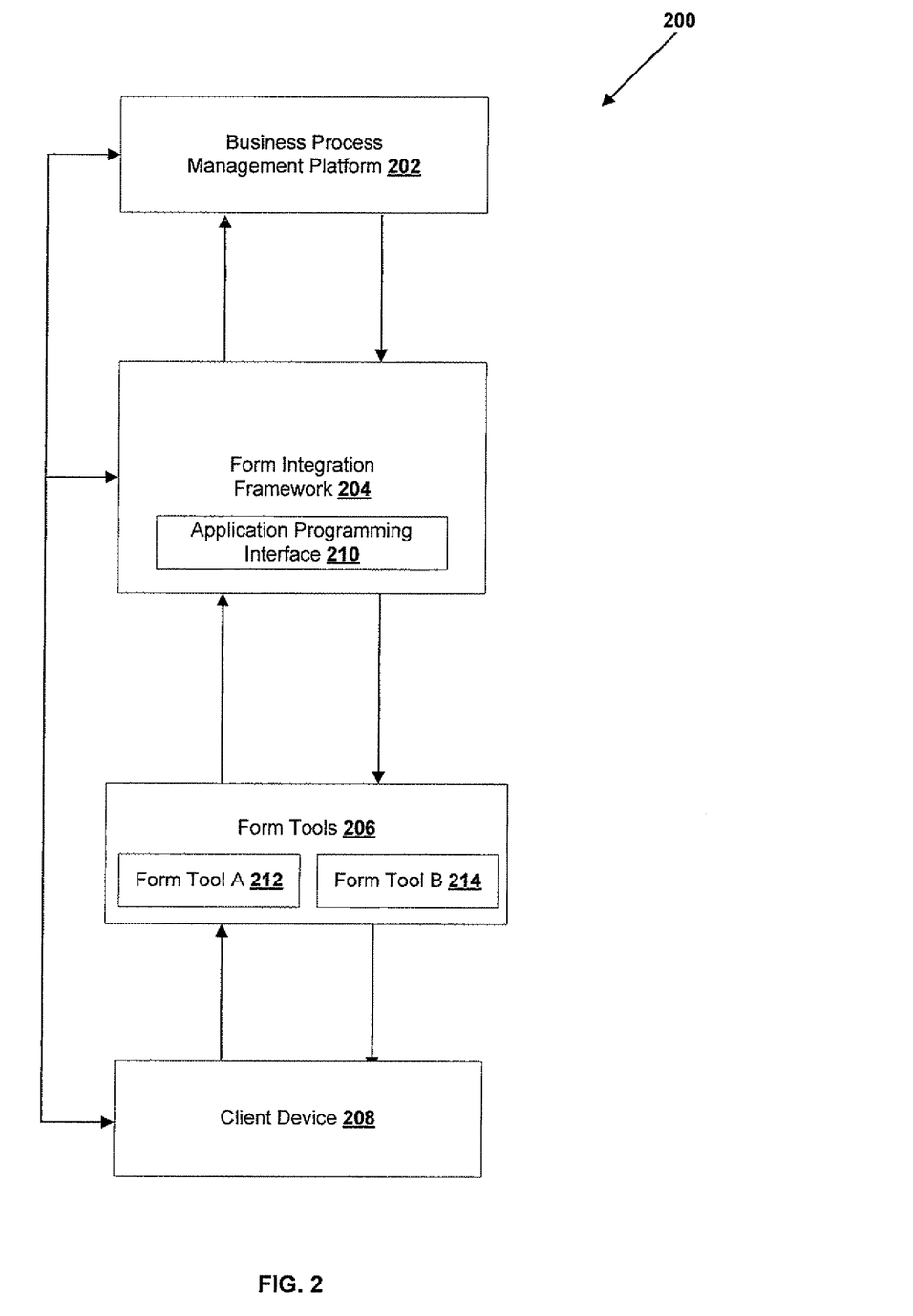
FIG. 2 is a diagram of a second particular embodiment of a system to integrate a plurality of form related workflow tools.

Referring to FIG. 2, a system 200 is disclosed that includes a business process management (BPM) platform 202, a form integration framework 204, a plurality of form tools 206, and a representative client device 208. The form integration framework 204 includes an application programming interface (API) 210 and the form tools 206 include a form tool A 212 and a form tool B 214. The BPM platform 202, the form integration framework 204, the form tools 206, or any combination thereof may be adapted to communicate with the client device 208 via a network interface, such as the network interface 120 of FIG. 1.

The BPM platform 202 may be adapted to provide structure in managing a number of processes associated with the operations of a particular company. For example, the BPM platform 202 may be adapted to manage the flow of data and documents to various departments and employees within a company. To illustrate, the BPM platform 202 may include a workflow engine, such as the workflow engine 110 of FIG. 1, to manage the process of creating and using a purchase order for a particular item requested by a company employee or department.

The form integration framework 204 is adapted to provide a framework for structuring communications between the BPM platform 202 and the form tools 206. The form tools 206 may execute operations requested by the BPM platform 202 to implement one or more steps of a workflow process. In a particular embodiment, the form tools 206 each perform operations associated with a particular form type. Operations related to forms of a particular type may be used in relation to a number of workflow process steps. For example, a form having a first particular type, such as a FileNet® form, may be used as a purchase order form. Additionally, a form having a second particular type, such as a Lotus® form, may be used as an invoice form. The plurality of form tools 206 may include a first form tool to perform operations related to the FileNet® form and a second form tool to perform operations related to the Lotus® form.

The form integration framework 204 is adapted to serve as an intermediary between the BPM platform 202 and the plurality of form tools 206, such that the BPM platform 202 does not have to utilize a different API to communicate with each of the plurality of form tools 206. Instead, the form integration framework 204 includes an API 210 to facilitate communications between the BPM platform 202 and the plurality of form tools 206. In a particular embodiment, the API 210 includes a common set of instructions that can be sent to each of the plurality of form tools 206 to respond to form operation requests received from the BPM platform 202. For example, the API 210 includes a common set of instructions that can be used with the form tool A 212 and the form tool B 214 to perform operations related to forms having the type supported by the form tool A 212 and having the type supported by the form tool B 214.

In a first illustrative embodiment, the BPM platform 202 sends a request to the form integration framework 204 related to configuring a form having a particular type to be used with respect to a particular workflow step. For example, the BPM platform 202 may send a request to the form integration framework 204 to configure a purchase order form having a Lotus® format. The form to be configured may have been designed via the BPM platform 202 or may have been imported from another application by the BPM platform 202. The form may have been designed to include a structure that includes one or more pages, one or more fields, values associated with the one or more fields, a layout of the one or more fields, instructions related to configuring the form, or any combination thereof. In response to receiving the form configuration request, the form integration framework 204 may identify the particular form tool of the plurality of form tools 206 that is compatible with the requested Lotus® form, such as the form tool A 212. In an illustrative, non-limiting embodiment, the form integration framework 204 may identify the particular form tool according to a form type specified by metadata associated with the form operation request. For example, the form operation request may include a character string indicating a particular form type. Each form type may be associated with a different character string.

After identifying the form tool compatible with the particular form type, the form integration framework 204 may invoke the API 210 to generate one or more instructions required to respond to the form configuration request received from the BPM platform 202. For example, the form integration framework 204 may generate form feature discovery instructions via the API 210 to identify a first set of features associated with the particular form type. The form integration framework 204 sends the instructions to the form tool compatible with the particular type of form. The form tool compatible with the particular form type, such as the form tool A 212, executes the instructions received from the form integration framework 204. For example, upon receiving form feature discovery instructions related to identifying the set of features associated with the particular form type, the form tool A 212 may provide form feature data to the form integration framework 204 indicating the set of features associated with the particular type of form. In an illustrative, non-limiting embodiment, the set of features associated with the particular type of form may include rendering the form as read-only, rendering the form with customized and/or standard toolbar buttons, rendering the form with certain portions of the form hidden, or any combination thereof.

The form integration framework 204 may provide a set of user interfaces to the client device 208 to configure the form. The set of user interfaces provided by the form integration framework 204 may be adapted to guide a workflow designer through a number of steps related to configuring the requested form. In one embodiment, the form integration framework 204 provides the set of user interfaces related to configuring the form based on the form feature data received from one or more of the form tools 206. For example, the set of user interfaces provided by the form integration framework 204 may include a number of configurable options related to features of the form type associated with the requested form. To illustrate, the set of user interfaces may include a configurable option to render the form as read-only, a configurable option related to hiding a particular portion of the form, and one or more configurable options related to customized or standard toolbar buttons. In an illustrative, non-limiting embodiment, one or more of the form tools 206 may provide a portion of the content included in the set of user interfaces provided to the client device 208 for configuring a particular form in addition to the content provided by the form integration framework 204.

The set of user interfaces provided to the client device 208 may be adapted to configure the form to include at least one of the set of features associated with the particular form type of the form to generate a configured form. For example, the set of user interfaces may be adapted to configure the form to be read-only at a specified step of a workflow process. Additionally, the set of user interfaces may be adapted to configure the form to hide a portion of the form at another step of the workflow process, but without the read-only feature being enabled for that step. The form integration framework 204 may receive form configuration data from the client device 208 via the set of user interfaces and then send the form configuration data to the BPM platform 202, to a data store, such as the content engine 108 shown in FIG. 1, or any combination thereof. The BPM platform 202 may then use the form configuration data in a particular workflow process. The form configuration data may include features of a particular form, such as a read-only purchase order form, that are enabled during certain steps of the workflow process. The form configuration data may also include criteria related to the routing of the form through the particular workflow process. The workflow process routing criteria included in the form configuration data may also be specified via the set of user interfaces. In an example, the form configuration data may indicate that a form is to be sent to one workflow participant when a specified form field has a certain value and that the form is to be sent to another workflow participant when the specified form field has a different value.

In another illustrative embodiment, the BPM platform 202 may send a form operation request to the form integration framework 204 in response to a request to use a previously configured form in a particular step of the workflow process. The requested form may be associated with a workflow item in a workflow queue of a particular workflow participant. For example, after a purchase order form has been configured, the purchase order form may be presented to a particular workflow participant to fill in certain fields of the form. The BPM platform 202 may send a request to the form integration framework 204 to provide the purchase order form to the particular workflow participant. After receiving the form operation request from the BPM platform 202, the form integration framework 204 may identify one of the plurality of form tools 206 that is operable to execute the form operation request. For example, the form integration framework 204 may be adapted to identify that the form tool B 214 is operable to respond to the received form operation request to render the requested form. The form integration framework 204 may then invoke the API 210 to generate one or more form rendering instructions to respond to the form operation request. The form rendering instructions generated by the API 210 may be related to characteristics of the requested form specified during the form configuration process. For example, the form rendering instructions generated by the API 210 may relate to rendering the requested form as a read-only form, to render the requested form with standard and customized toolbar buttons, to show certain page tabs, to hide other page tabs, to set a notification bar on the window, or any combination thereof.

The form integration framework 204 may send the generated form rendering instructions to the form tool B 214. Form tool B 214 may generate a set of user interfaces to be provided to the client device 208. The set of user interfaces may be related to the requested form based on the instructions received from the API. For example, the set of user interfaces may include one or more pages of the requested form with the features specified by the form configuration data.

The form platform B 214 may receive data related to the requested form from the client device 208. For example, a workflow participant may enter values associated with one or more form fields at the client device 208 in accordance with a particular workflow step and the client device 208 may forward the data associated with the particular workflow step to the BPM platform 202 via the form integration framework 204. After receiving the workflow step data associated with the form from the client device 208 via the set of user interfaces, the form tool B 214 may send the workflow step data received via the set of user interfaces to the BPM platform 202 via the form integration framework 204. The BPM platform 202 may send the workflow step data received via the set of user interfaces to a data store, such as the content engine 108, shown in FIG. 1. Additionally, the BPM platform 202 may store the workflow step data within the BPM platform 202 for use in routing the form through a workflow process.

In an illustrative, non-limiting embodiment, the form integration framework 204 may receive data related to the configuration and management of the features of the BPM platform 202, such that the set of user interfaces provided to the client device 208 are rendered by a particular form tool according to the received configuration and management data. In this way, the individual form tools 212, 214 are not required to be aware of the features of the BPM platform 202. Thus, new features of the BPM platform 202 are reflected only once through the form integration framework 204 rather than through each of the form tools 212, 214, which simplifies the integration of the form tools 212, 214 with the BPM platform 202. Further, certain aspects of the user interfaces provided to the client device 208 related to each of the plurality of form tools may be common. Thus, the form integration framework 204 may render the portions of the user interface that are common to one or more of the form tool user interfaces, while the form tools 212, 214 may render the aspects of their respective user interfaces that are unique to the particular form type supported by the corresponding form tool. This also simplifies the integration of the form tools 212, 214 with the BPM platform 202. For example, user interfaces associated with different form tools may include a common banner or a common side bar that is rendered by the form integration framework 204, while a form of a particular type is rendered in the user interfaces by the corresponding form tool.

In another illustrative embodiment, the BPM platform 202 sends a form operation request to the form integration framework 204 related to processing a form, but not related to presenting the form to a client device via a user interface. For example, the BPM platform 202 may determine that fields of a particular form need to be filled in before sending a workflow item to a workflow queue of a particular workflow participant. In another example, the BPM platform 202 may need to know a value associated with a certain field of a form to determine a next workflow step to perform or to determine a workflow participant required to receive the form. To illustrate, the BPM platform 202 may generate an invoice form from a purchase order form if the item or items requested in the purchase order relate to a certain type of equipment. In another illustration, the BPM platform 202 may route a purchase order form to a supervisor for approval when the amount of the items requested is above a threshold amount or the purchase order may be automatically approved when the amount of items requested is below the threshold amount. In other examples, the BPM platform 202 may need to render a form as a PDF document or as a TIFF document before providing the form to a workflow participant.

In response to receiving a form operation request from the BPM platform 202 that is to be processed without involving a client device, the form integration framework 204 identifies one of the plurality of form tools 206 operable to respond to the form operation request and invokes the API 210 to generate one or more instructions to respond to the form operation request. The form integration framework 204 then sends the instructions to the respective form tool, such as the form tool A 212. The form tool A 212 is adapted to respond to the one or more instructions by performing the requested operations and providing form operation output data. For example, the form tool A 212 may be adapted to retrieve a requested value from a specified form field and send that value to the BPM platform 202 via the form integration framework 204. In another example, the form tool A 212 may be adapted to automatically pre-populate certain fields of a form using values provided by the BPM platform 202. The form tool A 212 may send data related to the pre-populated form to the BPM platform 202 via the form integration framework 204.

Figure 3:
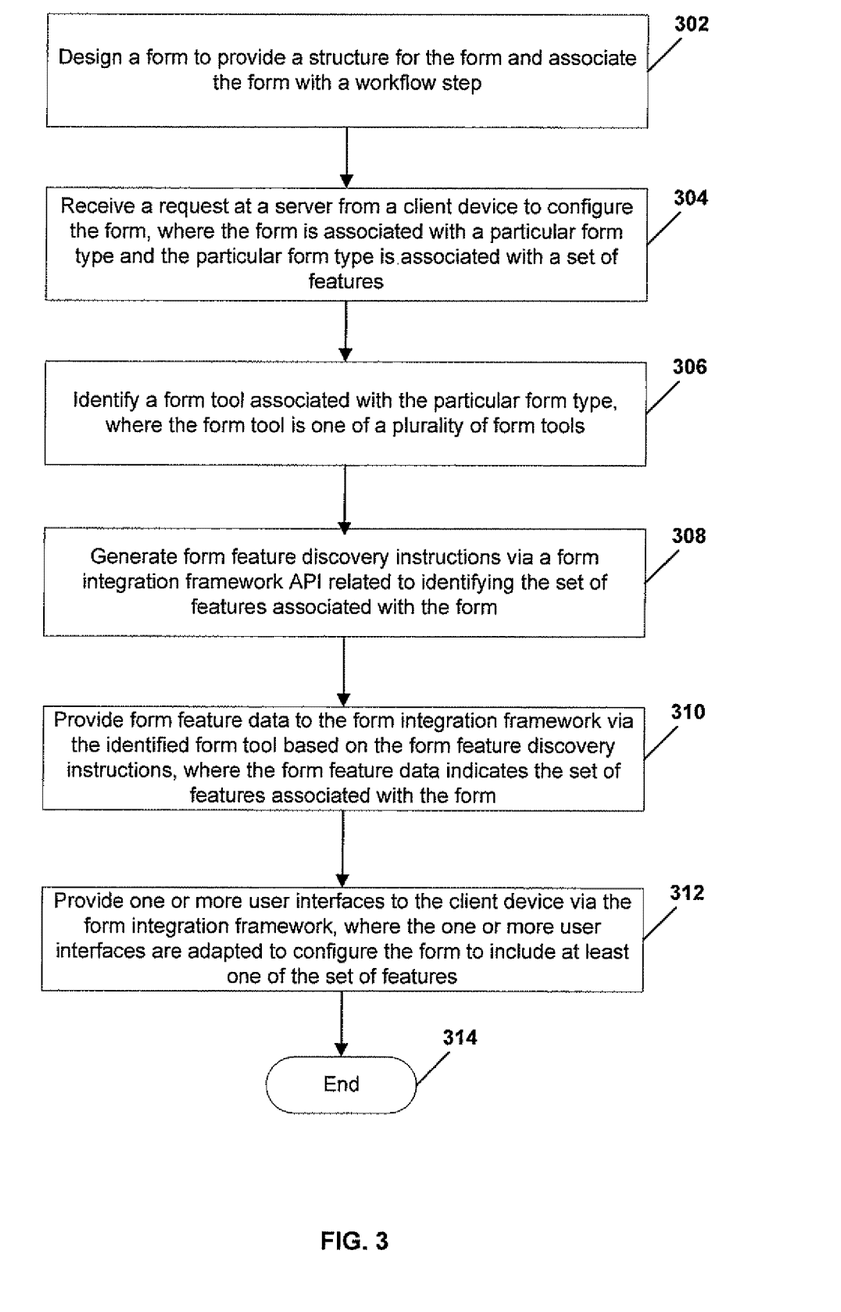
FIG. 3 is a flow diagram of a particular embodiment of a method to integrate a plurality of form related workflow tools in configuring a form.

FIG. 3 is a flow diagram of a particular embodiment of a method to integrate a plurality of form related workflow tools in configuring a form. At 302, a form is designed to provide a structure for the form and the designed form is associated with a particular workflow step of a workflow process. The structure of the form may relate to one or more pages of the form, one or more fields of the form, values associated with the one or more fields of the form, a layout of the one or more fields of the form, or any combination thereof. The form may be designed via a business process management (BPM) platform associated with a particular company or the form may be designed via another application and later incorporated into the workflow process via the BPM platform. Moving to 304, a request is received at the BPM platform of a server from a client device to configure the form associated with the particular workflow step. The form is associated with a form type of a plurality of form types and each form type is associated with a respective set of features. Proceeding to 306, a form integration framework identifies a form tool associated with the particular form type of the form. The form tool is one of a plurality of form tools and each form tool is operable to process requests related to operations associated with one particular form type.

At 308, a form integration framework application programming interface, (API) generates form feature discovery instructions related to identifying the set of features associated with the form type of the form. The form integration framework API utilizes a common set of instructions adapted to direct each of the plurality of form tools to respond to requests to configure forms of the type associated with each respective form tool. Moving to 310, the form tool provides form feature data based on the form feature discovery instructions to the form integration framework. The form feature data indicates the set of features associated with the form. Proceeding to 312, the form integration framework provides one or more user interfaces to the client device. The one or more interfaces are adapted to configure the form to include at least one of the set of features associated with the form to generate a configured form. In an illustrative, non-limiting embodiment, form configuration data related to the configured form may be stored at a content engine and retrieved when the workflow step associated with the form is invoked by the BPM platform. The form configuration data may include form feature data, data related to routing the form through the workflow process, or any combination thereof. The method terminates at 314.

Figure 4:
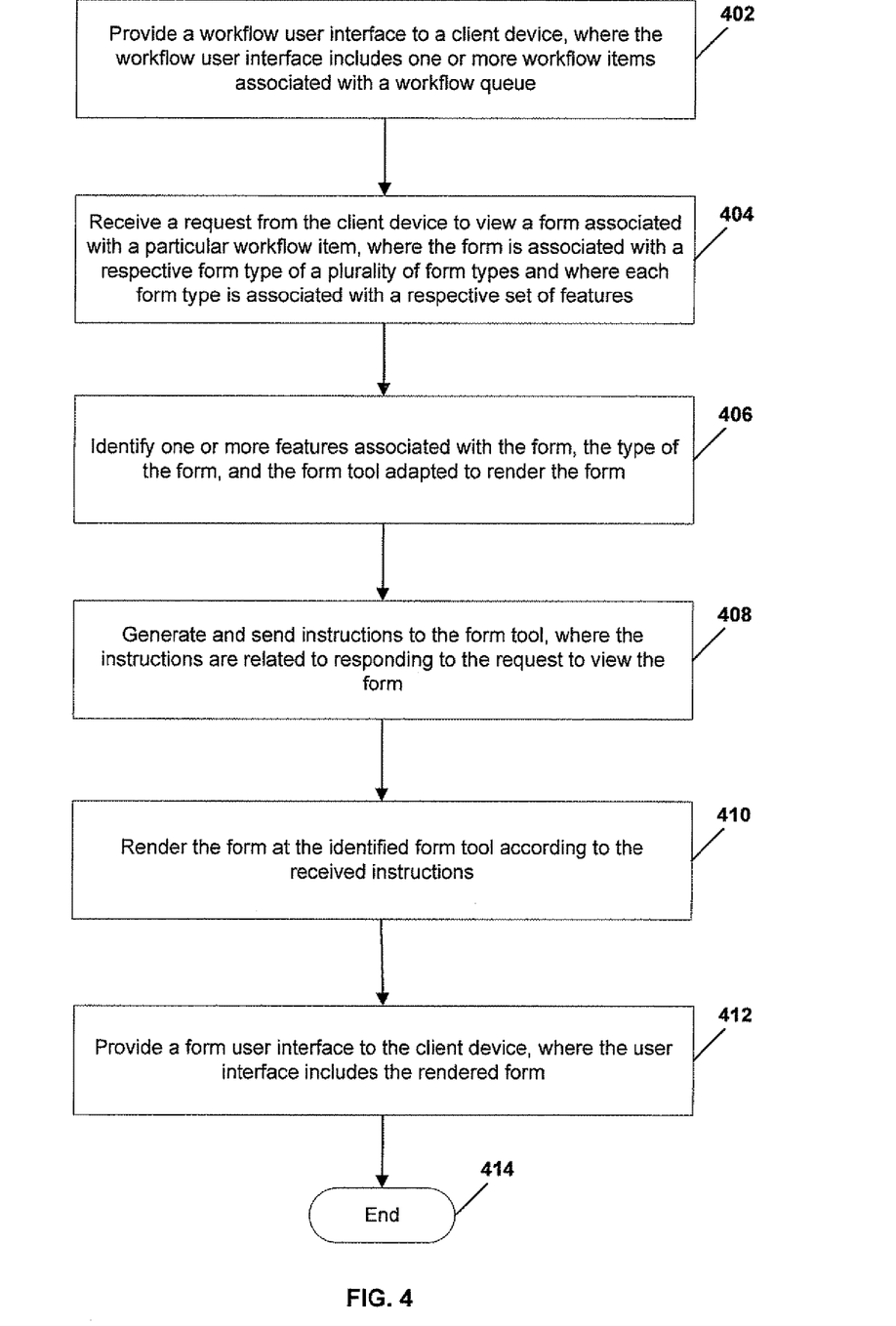
FIG. 4 is a flow diagram of a particular embodiment of a method to integrate a plurality of form related workflow tools while using a form in a workflow step.

FIG. 4 is a flow diagram of a particular embodiment of a method to integrate a plurality of form related workflow tools while using a form in a workflow process. At 402, a BPM server provides a workflow user interface to a client device. The workflow user interface includes one or more workflow items associated with a workflow queue of a particular workflow participant. Moving to 404, the BPM server receives a request from the client device to view a form associated with a particular workflow item. The form is associated with a respective form type of a plurality of form types, such as a Lotus® form type or a FileNet® form type. Each form type is also associated with a respective set of features. Proceeding to 406, a form integration framework identifies the form type of the form, one or more features associated with the form, and the form tool adapted to render the form. The identified form tool is one of a plurality of available form tools and each of the plurality of form tools support at least a respective one of the plurality of form types.

At 408, the form integration framework generates and sends instructions to the identified form tool to respond to the request to view the form. The instructions may be generated based on the one or more features associated with the form, a template associated with the form, or any combination thereof. The instructions are generated by an application programming interface (API) that uses a common set of instructions to communicate with each of the plurality of form tools. Moving to 410, the identified form tool renders the form according to the instructions received from the form integration framework. Proceeding to 412, the form tool provides a user interface to the client device, where the user interface includes the rendered form. The user interface provided to the client device may include informational content, such as instructions for completing a workflow step associated with the form, data associated with the workflow process, such as monetary thresholds, deadlines, or any combination thereof. The user interface may also include controls for interacting with a workflow engine of the BPM server to complete the workflow step associated with the form or reassigning the workflow item to the queue of another workflow participant. The method terminates at 414.

According to particular embodiments, a workflow integration framework including an application programming interface (API) is provided to integrate a number of workflow tools with a business process management (BPM) platform. The API of the workflow integration framework efficiently provides a common set of instructions to direct communications between the workflow tools and the BPM platform. Additionally, the API of the workflow integration framework gives designers of workflow processes flexibility in the tools used to implement particular workflow processes.

Particular embodiments can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Further, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and features as defined by the following claims.

What is claimed is:

1. A method, comprising:
receiving a first request at a server from a client device to configure a first form associated with a first workflow step of a plurality of workflow steps, wherein the first form is of a first form type that supports a plurality of presentation features, and wherein each workflow step of the plurality of workflow steps corresponds to a particular set of presentation features of the plurality of presentation features supported by the first form type;
identifying a first form tool that is compatible with the first form type based on metadata that is associated with the first request, wherein the first form tool is one of a plurality of form tools, and wherein the metadata specifies the first form type;
generating first form feature discovery instructions via an integration framework application comprised of an integration framework application programming interface (API), wherein the integration framework API utilizes a common set of instructions adapted to direct each of the plurality of form tools, where the first form tool is configurable to render at least a first portion of a first set of user interfaces (UIs);
identifying a first set of presentation features of the plurality of presentation features that correspond to the first workflow step based on the first form feature discovery instructions;
providing first form feature data to the integration framework API via the first form tool based on the first form feature discovery instructions, wherein the first form feature data indicates the first set of presentation features; and
providing the first set of UIs to the client device via the integration framework API based on the first form feature data, wherein the first set of UIs is adapted to configure the first form to generate a first configured form that includes the first set of presentation features.

2. The method of claim 1, further comprising sending first form configuration data to a content engine from the server, wherein the first form configuration data indicates the first set of presentation features of the first configured form.

3. The method of claim 1, wherein the plurality of presentation features includes a read-only feature, a hide form data feature, a toolbar configuration feature, a page tabs configuration feature, or any combination thereof, and wherein the first set of user interfaces includes a plurality of configurable options related to the plurality of presentation features supported by the first form type.

4. The method of claim 1, further comprising:
receiving a second request at the server from the client device to configure a second form of a second form type associated with a second workflow step of a second plurality of workflow steps, wherein the second form type supports a second plurality of presentation features, and wherein each workflow step of the second plurality of workflow steps corresponds to a set of presentation features of the second plurality of presentation features;
identifying a second form tool that is compatible with the second form type based on metadata associated with the second request, wherein the metadata specifies the second form type;
generating second form feature discovery instructions via the integration framework API;
identifying a second set of presentation features of the second plurality of presentation features that correspond to the second workflow step based on the second form feature discovery instructions;
providing second form feature data to the integration framework API via the second form tool based on the second form feature discovery instructions, wherein the second form feature data indicates the second set of features; and
providing a second set of user interfaces (UIs) to the client device via the integration framework API based on the second form feature data, wherein the second set of UIs is adapted to include the second form with the second set of presentation features to generate a second configured form and further where the integration framework API is configurable to provide at least a second portion to the second set of UIs as rendered by the second form tool to the client device.

5. The method of claim 4, wherein the first set of presentation features is different from the second set of presentation features.

6. The method of claim 4, wherein the second form is associated with the first workflow step or with a the second workflow step.

7. The method of claim 1, further comprising designing the first form to provide a first form structure, wherein the first form structure includes one or more pages, one or more fields, values associated with the one or more fields of the first form, a layout of the one or more fields, or any combination thereof.

8. The method of claim 1, wherein the first form tool is not configured to render portions of a second form type, where the integration framework API is configured to render a second portion of the UIs, to combine the first and second portions, and to provide the combination to the client device.

9. A system, comprising:
an integration framework executable by a processor to:

receive a request from a workflow engine to render a first form associated with a first workflow step of a plurality of workflow steps, wherein the first form is associated with a first form type of a plurality of form types and wherein the first form type is associated with a plurality of presentation features, and wherein the first workflow step corresponds to a first set of presentation features of the plurality of presentation features;

determine, based on metadata associated with the request, a first form tool to render the first form based on the first form type, wherein the first form tool is one of a plurality of form tools, wherein the metadata identifies the first form type;

identify the first set of presentation features corresponding to the first workflow step;

generate first form rendering instructions via an application programming interface (API), wherein the first form rendering instructions are based on the first set of presentation features corresponding to the first workflow step, and wherein the API includes a common set of instructions adapted to direct each of the plurality of form tools;

send the first form rendering instructions to the first faun tool, wherein the first form tool is adapted to render a first portion of the first form based on the first form rendering instructions; and, provide at least the first portion as at least part of a user interface to a client device.

10. The system of claim 9, further comprising a web server adapted to communicate with the client device via an Internet Protocol network.

11. The system of claim 9, wherein each of the plurality of form tools is designated to render a particular form type.

12. The system of claim 9, further comprising a workflow user interface module adapted to:

provide a workflow user interface to the client device, wherein the workflow user interface includes one or more workflow items associated with a workflow queue, wherein each workflow item identifies a particular form and a particular workflow step associated with the particular form;

receive a request from the client device to view the first form based on a first workflow item that identifies the first form and the first workflow step; and forward the request to view the first form to the workflow engine.

13. The system of claim 12, wherein the first form tool receives workflow step completion data from the client device indicating that the first workflow step associated with the first form has been completed; and forwards the workflow step completion data to the workflow engine.

14. The system of claim 13, wherein the workflow engine is adapted to add an additional workflow item to an additional workflow queue in response to receiving the workflow step completion data, wherein the additional workflow item identifies the first form and an additional workflow step associated with the first form.

15. The system of claim 9, wherein the integration framework is configurable to enable a second portion at the first form to be usable as part of the user interface (UI), and where the first form tool is unable to render at least a second form type.

16. The system of claim 9, wherein the first form tool is adapted to communicate with a remote server to render the first form.

17. A computer-readable storage device, comprising a computer readable program that, when executed on a computer, causes the computer to:

receive a workflow operation request, wherein the workflow operation request is associated with a particular workflow step, wherein the workflow operation request is associated with a particular form of a first form type, the first form type supporting a plurality of presentation features, wherein the particular workflow step is associated with a first set of presentation features of the plurality of presentation features, and wherein the first set of presentation features corresponds to the particular workflow step;

identify a workflow tool operative to execute the workflow operation request based on metadata associated with the workflow operation request, wherein the identified workflow tool is one of a plurality of workflow tools;

generate a first set of one or more instructions to respond to the workflow operation request via an application programming interface (API), wherein the API includes a common set of instructions adapted to direct each of the plurality of workflow tools;

generate a second set of one or more instructions to render a first portion of a form having the first form type by a first form tool, the first portion usable as at least part of a user interface (UI); and send the first set of one or more instructions to the identified workflow tool.

18. The computer-readable storage device of claim 17, wherein the computer readable program when executed on the computer causes the computer to receive workflow operation output data from the identified workflow tool in response to execution of the first set of one or more instructions to respond to the workflow operation request.

19. The computer-readable storage device of claim 18, wherein the computer readable program when executed on the computer causes the computer to forward the workflow operation output data to a workflow engine.

20. The computer-readable storage device of claim 17, wherein the computer readable program is configured to render a second portion at the form usable at the UI without using the first form tool, and where the first form tool is not configured to render the second portion.

* * * * *